UNITED STATES PATENT OFFICE.

ROBERT F. GARDINER, OF CLARENDON, VIRGINIA.

PROCESS OF MAKING A MIXED POTASH, NITROGENOUS, AND PHOSPHATIC FERTILIZER.

1,261,116. Specification of Letters Patent. Patented Apr. 2, 1918.

No Drawing. Application filed August 6, 1917. Serial No. 184,749.

(DEDICATED TO THE PUBLIC.)

*To all whom it may concern:*

Be it known that I, ROBERT F. GARDINER, a citizen of the United States of America, and an employee of the Department of Agriculture of the said United States, residing at Clarendon, in the county of Alexandria, State of Virginia, (whose post-office address is Clarendon, Virginia,) have invented a new and useful Process of Making a Mixed Potash, Nitrogenous, and Phosphatic Fertilizer.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

My invention relates to the production of potassium sulfate or potassium ammonium sulfate, mono-calcium phosphate, di-calcium phosphate, phosphoric anhydrid or compounds or mechanical mixtures of potassium, calcium, and ammonium, combined with phosphoric anhydrid and sulfuric acid produced by the methods hereinafter to be described, either by fusion with or in contact in water solution with ammonium sulfate, ammonium acid sulfate, ammonium pyrosulfate or any intermediary compounds formed by means of heating ammonium sulfate under suitable conditions from 25° centigrade up to the dissociation temperature of ammonium sulfate either in a dry or wet state or condition, with or without pressure, in contact with alunite, leucite, muscovite, orthoclase and phosphatic substances such as phosphate rock, pebble phosphate and apatite ground to pass through sieves of from 60 to 200 mesh. By mesh is meant the number of meshes in the sieves employed to the linear inch.

The objects of my invention are:

1. To obtain a phosphatic, nitrogenous, and potash fertilizer by direct treatment of the aforementioned phosphorous and potash bearing minerals with nitrogen carrying compounds, namely: ammonium sulfate and its dissociation products.

2. To provide a comparatively economical means of meeting the soil's immediate plant food needs, as well as providing for its future necessities.

In practising my process, I take a batch of alunite, leucite, muscovite, orthoclase, ground to 130 mesh or any mesh between 60 and 200, taken either collectively or individually and treated with phosphate rock, pebble phosphate and apatite either collectively or individually in contact with suitable proportions of ammonium sulfate at temperatures at or below 150° centigrade, passing through all intermediate temperatures up to and above 400° centigrade in suitable containers, such for example as retorts of various designs modified for intermittent or continuous operation, heated by any desirable method, such for example as waste gases, the gaseous products produced by heating ammonium sulfate are to be absorbed in water or sulfuric acid to partially regenerate ammonium sulfate or other nitrogen sulfur substances, the fused material to be tapped out in a manner similar to a slag, cooled and ground to the desired degree of fineness for the trade.

By a previous heating of phosphate rock, pebble phosphate, apatite, alunite, muscovite, orthoclase, and leucite to about 900° centigrade when ground to 130 mesh or any mesh between 60 and 200, the phosphoric acid ($P_2O_5$) and potash present in these minerals is rendered more available than without such treatment.

The advantages of my invention are:

That by means of the reactions which take place both water soluble and two per cent. citric acid soluble phosphate and potash compounds are produced when ammonium sulfate is fused with phosphate rock, pebble phosphate, apatite, alunite, muscovite, orthoclase and leucite ground to 130 mesh or any mesh from 60 to 200.

Considerable amounts of total water soluble and two per cent. citric acid soluble phosphate and potash compounds are produced when water is brought in contact with the fusion products of ammonium sulfate and phosphate rock, pebble phosphate, apatite, alunite, muscovite, orthoclase, and leucite, especially with phosphate rock and leucite. There is a continuous solubility of the phosphorous and potash substances in these minerals until the ammonium acid sulfate, ammonium pyrosulfate and other fusion products of ammonium sulfate are removed from contact with the previously mentioned phosphorous and potash bearing minerals.

The action of the dissociation products of ammonium sulfate on the aforementioned phosphorous and potash bearing minerals takes place with a minimum expenditure of heat energy. The temperature range by means of fusion beginning at the fusion temperature of ammonium sulfate and continuing up to about 400° centigrade, the dissociation temperature of the fusion products.

The action of the products of dissociation of ammonium sulfate produced by its fusion up to the complete dissociation temperature have a more pronounced action on the previously mentioned phosphorous and potash bearing minerals, when treated with water, than by a water solution contact of ammonium sulfate and its aqueous dissociation products alone.

The extraction of phosphoric acid ($P_2O_5$) from phosphate rock, pebble phosphate, apatite and potash from alunite, muscovite, orthoclase, and leucite is more complete when those minerals are previously heated to about 900° centigrade and subsequently fused with ammonium sulfate at about its dissociation temperature.

Under proper physical conditions any ammonia, sulfur trioxid or sulfur dioxid expelled during the dissociation of the ammonium sulfate can be recovered as ammonium sulfate, sulfites and nitrogen sulfur derivatives or their hydrolytic dissociation products, so that the process is in part regenerative.

Due to the facility of recovering the volatile reaction products expelled with so little expenditure of heat energy, and the obtaining of a final product which can be so easily ground to a suitable degree of fineness containing available phosphoric acid ($P_2O_5$), potash, and nitrogen, the invention, when these factors are taken into consideration, is essentially an economical one for the production of a medium grade mixed potash, phosphatic and nitrogenous fertilizer.

Since ammonium sulfate is produced as a biproduct of the distillation of coal used for gas works, a biproduct of shale oil works, blast furnaces, carbonization of peat and bones, and from calcium cyanamid, the invention might profitably be employed in connection with those industries, provided that the cost of obtaining the raw materials is not prohibitive.

Having thus described my invention, I claim:

1. A process for making a mixed potash, nitrogenous and phosphatic fertilizer consisting in grinding phosphate rock, pebble phosphate, apatite, alunite, muscovite, orthoclase and leucite separately to 130 mesh and mixing them, and then adding ammonium sulfate thereto, heating the mixture in suitable containers at temperatures below 150° centigrade and through all intermediate temperatures up to and including 400° centigrade until the gaseous decomposition products of the ammonium sulfate are copiously evolved, substantially as described.

2. A process for making mixed potash, nitrogenous and phosphatic fertilizer consisting in grinding phosphate rock, pebble phosphate, apatite, alunite, muscovite, orthoclase and leucite to mesh ranging from 60 to 200 mesh and mixing them, and then adding ammonium sulphate thereto, heating the mixture in suitable containers at temperatures below 150° centigrade and through all intermediate temperatures up to and including 400° centigrade until the gaseous decomposition products of the ammonium sulfate are copiously evolved, substantially as described.

In testimony whereof, I affix my signature in the presence of two subscribing witnesses.

ROBERT F. GARDINER.

Witnesses:
 THOMAS SHAW,
 GEORGE L. HOFFMAN.